(12) United States Patent
Tame

(10) Patent No.: US 6,637,819 B2
(45) Date of Patent: Oct. 28, 2003

(54) FOLD FLAT SEAT ASSEMBLY

(75) Inventor: Omar D. Tame, West Bloomfield, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/014,647

(22) Filed: Dec. 11, 2001

(65) Prior Publication Data

US 2002/0079728 A1 Jun. 27, 2002

Related U.S. Application Data

(60) Provisional application No. 60/255,334, filed on Dec. 11, 2000.

(51) Int. Cl.[7] .................................................. B60N 2/36
(52) U.S. Cl. .............................. 297/331; 297/335; 5/43; 296/65.08
(58) Field of Search ................................ 297/331, 335, 297/378.12, 378.1, 383; 248/429, 430; 296/65.08, 65.09, 65.15; 5/24, 27, 37.1, 43, 46.1

(56) References Cited

U.S. PATENT DOCUMENTS

| 3,227,488 A | 1/1966 | Kosab et al. |
| 4,654,902 A | 4/1987 | Shrock et al. |
| 4,955,973 A | 9/1990 | Provencher |
| 4,957,321 A | 9/1990 | Martin et al. |
| 5,039,155 A | 8/1991 | Suman et al. |
| 5,052,748 A | 10/1991 | Fourrey et al. |
| 5,658,046 A | 8/1997 | Rus |
| 6,082,805 A | 7/2000 | Gray et al. |
| 6,113,187 A | 9/2000 | Sugiyama et al. |

FOREIGN PATENT DOCUMENTS

DE 43 19 119 C1 5/1994

*Primary Examiner*—Peter M. Cuomo
*Assistant Examiner*—Stephen D'Adamo
(74) *Attorney, Agent, or Firm*—Clark Hill PLC

(57) ABSTRACT

A seat assembly for an automotive vehicle comprising a main support frame adapted to secure the seat assembly to the floor of the vehicle. A seat cushion is rotatably journaled to the main support frame for rotation between a seating position and a fold flat position rotated generally 180 degrees about the frame. A seat back is pivotally coupled to the main support frame for rotation between a generally upright seating position to a fold flat position aligned generally flush with the seat cushion in the fold flat position. A lower track is fixedly secured to the main support frame and an upper track is fixedly secured to the seat back and slidably secured to the lower track. An automatic fold mechanism is operatively coupled between the upper track and the seat cushion for automatically rotating the seat cushion between the seating position and the fold flat position in response to fore and aft sliding movement of the upper track along the lower track.

16 Claims, 6 Drawing Sheets

FOLD FLAT SEAT ASSEMBLY

This application claims the benefit of Provisional Application No. 60/255,334, filed Dec. 11, 2000.

BACKGROUND OF THE INVENTION

1. Field of Invention

The present invention relates to a fold flat seat assembly wherein the seat cushion is rotated from a seating position to a fold flat position in response to rearward sliding movement of the seat assembly from a forward position to a rearward position.

2. Description of the Related Art

Seat assemblies for automotive vehicles commonly including one or more rows of rear seat assemblies including a seat cushion and a seat back coupled to the seat cushion. It is often desirable to pivot or fold both the seat cushion and seat back downwardly and against the floor of the vehicle to a fold flat position providing a cargo load floor in the vehicle. The seat cushion is commonly pivotally coupled to the floor of the vehicle by seat risers and pivotal from a generally horizontal seating position to a forwardly folded and upright position. The seat back is commonly pivotal from a generally upright position to a forwardly folded flat position adjacent the upright seat cushion.

It is also commonly known to pivot the seat back downwardly onto the seat cushion to a folded position. However, the overall stack height of the seat back on top of the seat cushion consumes much of the desired storage space in the vehicle and frustrates the desire for a flat and flush cargo load floor.

Therefore, it remains desirable to provide a seat assembly which folds flat having the seat cushion flush with the seat back to form a flat load floor in the vehicle.

SUMMARY OF THE INVENTION

The present invention relates to a seat assembly for an automotive vehicle comprising a main support frame adapted to secure the seat assembly to the floor of the vehicle. A seat cushion is rotatable journaled to the main support frame for rotation between a seating position and a fold flat position rotated generally 180 degrees about the frame. A seat back is pivotally coupled to the main support frame for rotation between a generally upright seating position to a fold flat position aligned generally flush with the seat cushion in the fold flat position. A lower track is fixedly secured to the main support frame and an upper track is fixedly secured to the seat back and slidably secured to the lower track. An automatic fold mechanism is operatively coupled between the upper track and the seat cushion for automatically rotating the seat cushion between the seating position and the fold flat position in response to fore and aft sliding movement of the upper track along the lower track.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
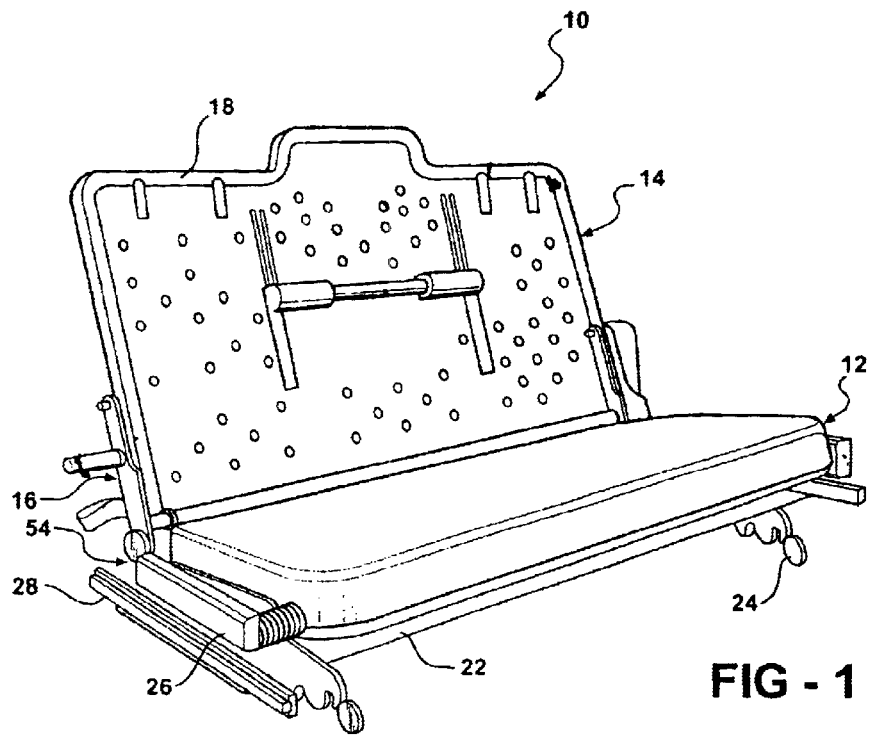
FIG. 1 is a front perspective view of the seat assembly in an upright seating position.
Figure 2:
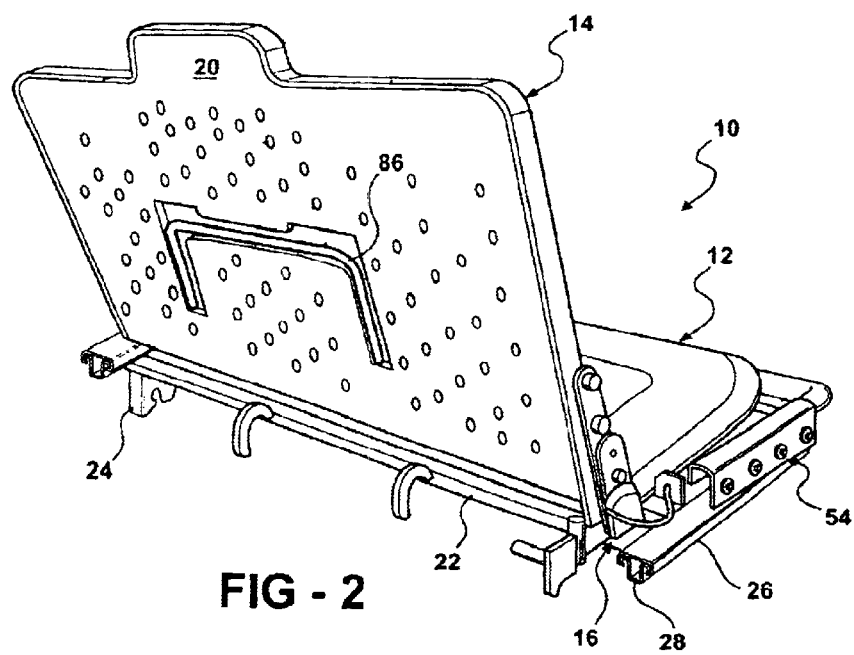
FIG. 2 is a rear perspective view of the seat assembly.
Figure 3:
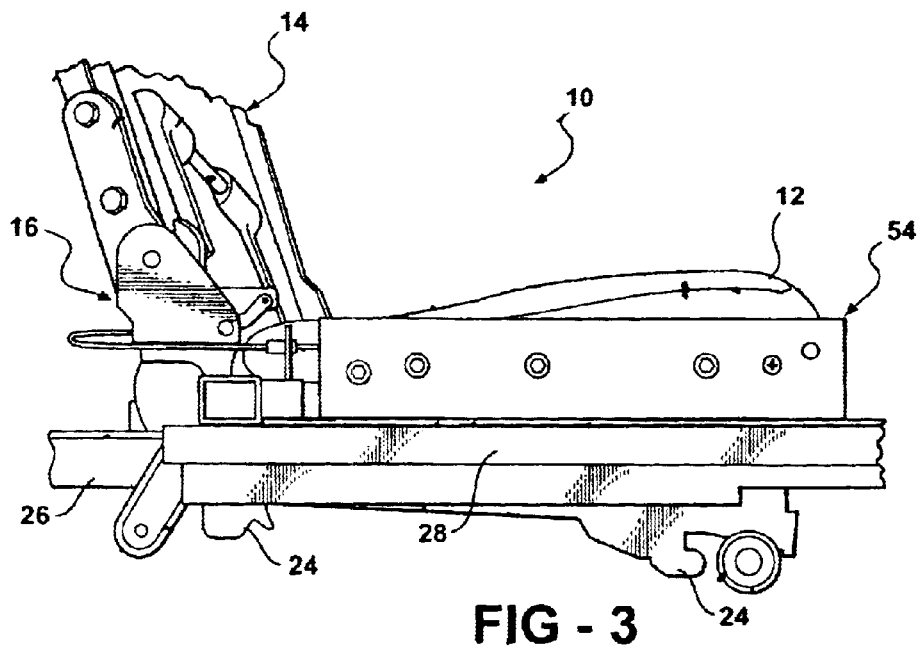
FIG. 3 is a side view of the seat assembly.

Referring to FIGS. 1–3, a seat assembly for use in an automotive vehicle is generally shown at 10 in a seating position. The seat assembly 10 includes a generally horizontal seat cushion 12 and a seat back 14. The seat back 14 is pivotally coupled to the seat cushion 12 by a pivot mechanism 16. The seat back 14 includes a rigid, generally U-shaped seat back frame 18 supporting a seat back panel 20. The seat back frame 18 and panel 20 are covered by a resilient contoured foam pad and trim cover as is commonly known to one skilled in the art. The seat assembly further includes a main support frame 22 having a plurality of releasable mounting hooks 24 for mounting the seat assembly 10 to a respective plurality of latch pins recessed in the floor of the vehicle as is commonly known in the art. The main support frame 22 includes an elongated upper track 26 slidably coupled to an elongate lower track 28 arranged on each opposing lateral side of the seat cushion 12. The upper and lower tracks 26, 28 have a corresponding generally U-shaped cross-section for interlocking the tracks 26, 28 while allowing longitudinal sliding movement therebetween as is known to one having ordinary skill in the art.

Figure 4:
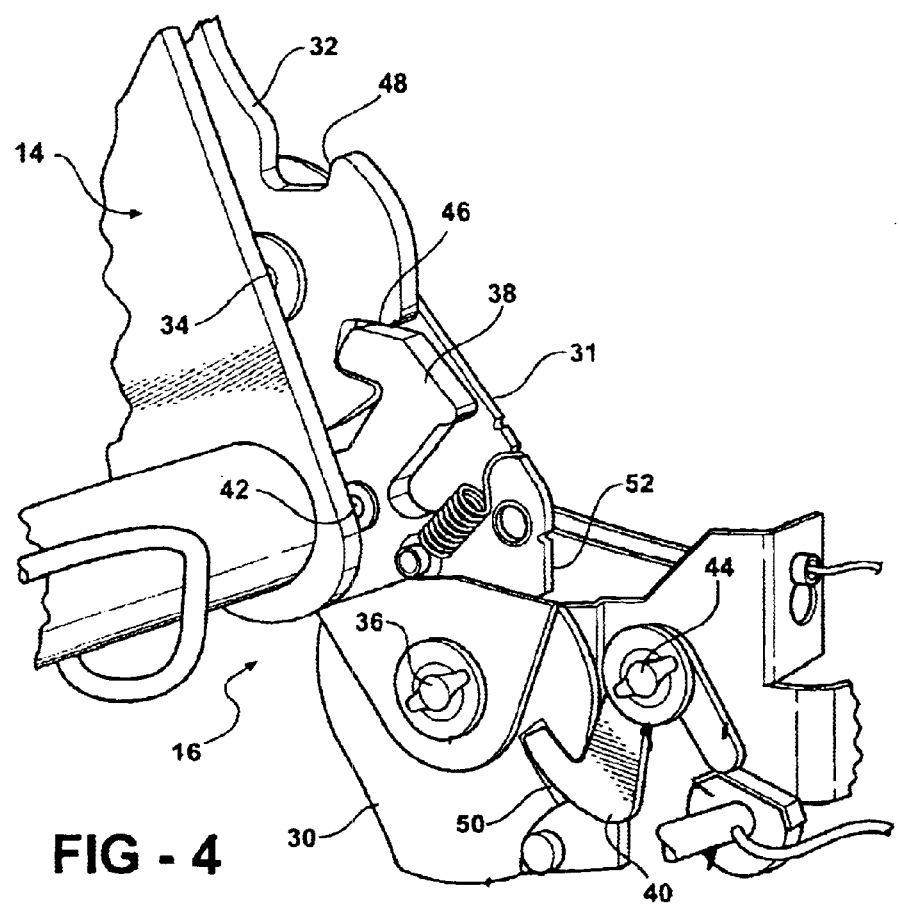
FIG. 4 is a perspective view of a pivot mechanism between the seat cushion and seat back of the seat assembly.

Referring to FIG. 4, a pivot mechanism 16 is also disposed on each opposing lateral side of the seat assembly 10 and each includes a lower pivot bracket 30 secured to the main support frame 22, an upper pivot bracket 32 fixedly secured to the seat back frame 18, and an intermediate bracket 31 pivotally coupled between the upper bracket 32 and lower bracket 30. The upper pivot bracket 32 is pivotally interconnected to the intermediate pivot bracket 31 by pivot pin 34. The lower pivot bracket 30 is pivotally interconnected to the intermediate pivot bracket 31 by pivot pin 36. The pivot mechanism 16 provides a dual pivot mechanism for pivoting the seat back 14 about either the upper pivot pin 34 or lower pivot pin 36 depending on the desired seat configuration. Specifically, the pivot mechanism 16 includes an upper pivot latch 38 for releasably interlocking the upper pivot bracket 32 and intermediate bracket 31 and a lower pivot latch 40 for releasably interlocking the lower pivot bracket 30 and the intermediate bracket 31. The upper pivot latch 38 is pivotally connected to the intermediate bracket 31 by pivot pin 42 and bias into locking engagement with the upper pivot bracket 32. The lower pivot latch 40 is pivotally connected to the lower pivot bracket 30 by pivot pin 44 and bias into locking engagement with the intermediate bracket 31. The upper pivot bracket 32 includes spaced apart first and second notches 46, 48 for receiving the upper latch 38 to lock the seat back 14 in the upright seating position, as shown in FIG. 1, and a dump position folded forwardly onto the seat cushion 12, respectively. The intermediate bracket 31 includes spaced apart first and second notches 50, 52 wherein the lower latch 40 is received in the first notch 50 when the seat back 14 is in either the seating position or dump position and released to be received in the second notch 52 to pivot the seat back 14 from the seating position to a fold flat position about the lower pivot pin 44 with the upper latch 38 locked in the first notch 46 of the upper bracket 32. Such pivot mechanism 16 is similar to those known to one skilled in the art and often referred to as a dual pivot mechanism.

Figure 8:
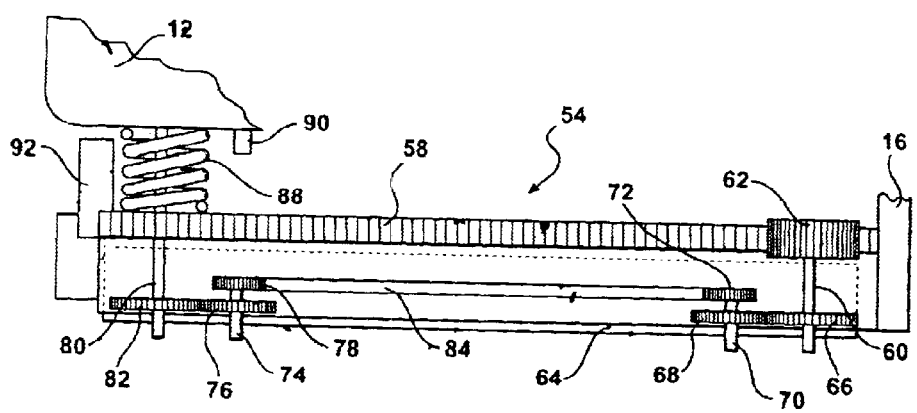
FIG. 8 is a top schematic view of the automatic fold mechanism.

Referring to FIGS. 5–8, the seat assembly 10 further includes an automatic (auto) fold mechanism 54 coupled between the seat cushion 12 and seat back 14. Each opposing lateral side of the seat assembly 10 includes an auto fold mechanism 54, therefore, only one side will be described in detail. The auto fold mechanism 54 includes a track lock 56 coupled between the upper track 26 and lower track 28 for releasably locking the upper track 26 to the lower track 28 and allowing fore and aft sliding movement therebetween as is commonly known in the art. The lower track 28 is fixedly secured to the main frame 22 and therefore remains stationary with the floor of the vehicle and relative to the seat cushion 12 and seat back 14. As best shown in FIG. 8, the auto fold mechanism 54 further includes a toothed rack 58 fixedly mounted to the upper surface of the upper track 26 and extending longitudinally therealong. The upper track 26 is connected to the seat back 14 via the pivot mechanism 16. The auto fold mechanism 54 also includes a first drive shaft 60 having a first end supporting a first drive gear 62 intermeshed with the toothed rack 58 and a second end rotatably support by a cage 64. A second drive gear 66 is mounted on the drive shaft 60 between the first and second ends and engaged with a first driven gear 68. A first driven shaft 70 supports the first driven gear 68 between a first end rotatably journaled to the cage 64 and a second end. A second driven gear 72 is supported on the second end of the first driven shaft 70. The auto fold mechanism 54 further includes a second driven shaft 74 supporting a third driven gear 76 between a first end rotatably journaled to the cage 64 and a second end. A fourth driven gear 78 is supported on the second end of the second driven shaft 74. A cushion shaft 80 extends outwardly from the seat cushion 12 to a distal end supporting a fifth driven gear 82 aligned and meshed with the third driven gear 76. Finally, a chain link 84 is engaged between the second driven gear 72 and the fourth driven gear 78.

Figure 9:
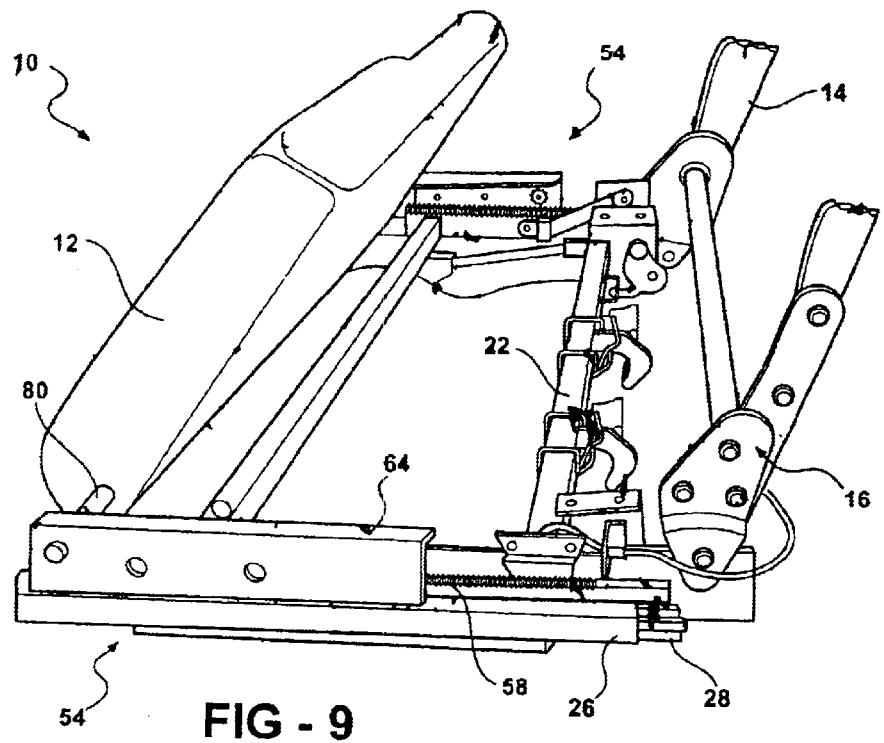
FIG. 9 is a perspective side view of the seat cushion rotating between a seating position and a fold flat position.

In operation, referring to FIG. 2, with the seat assembly 10 in the seating position, the track locks 56 are released by actuation of a towel bar 86 pivotally connected to the rear of the seat back 14. Cables extend from the towel bar 86 to the track locks 56 to unlock the upper track 26 from the lower track 28. The main support frame 22, and thus the lower tracks 28, are secured to the floor of the vehicle while the upper tracks 26 are free to slide along the lower tracks 28. The operator of the seat assembly 10 may now pull rearwardly on the seat back 14 to slide the seat back 14 and upper tracks 26 rearwardly along the lower tracks 28. As the upper tracks 26 slide rearwardly, the rack 58 which is fixed on the upper track 26 rotates the first drive gear 62, thus rotating the drive shaft 60 and second drive gear 66. The second drive gear 66 rotates the first driven gear 68 and second driven gear 72. The second driven gear 72 drives the chain link 84 to transfer the rotation of the first drive gear 62 to the fourth driven gear 78 and third driven gear 76. The third driven gear 76 engages and rotates the fifth driven gear 82 and cushion shaft 80. The cushion shaft 80 is fixedly secured to the front end of the seat cushion 12 to force the seat cushion to rotate 180 degrees as shown in FIGS. 9 and 10 to a fold flat position.

Figure 5:
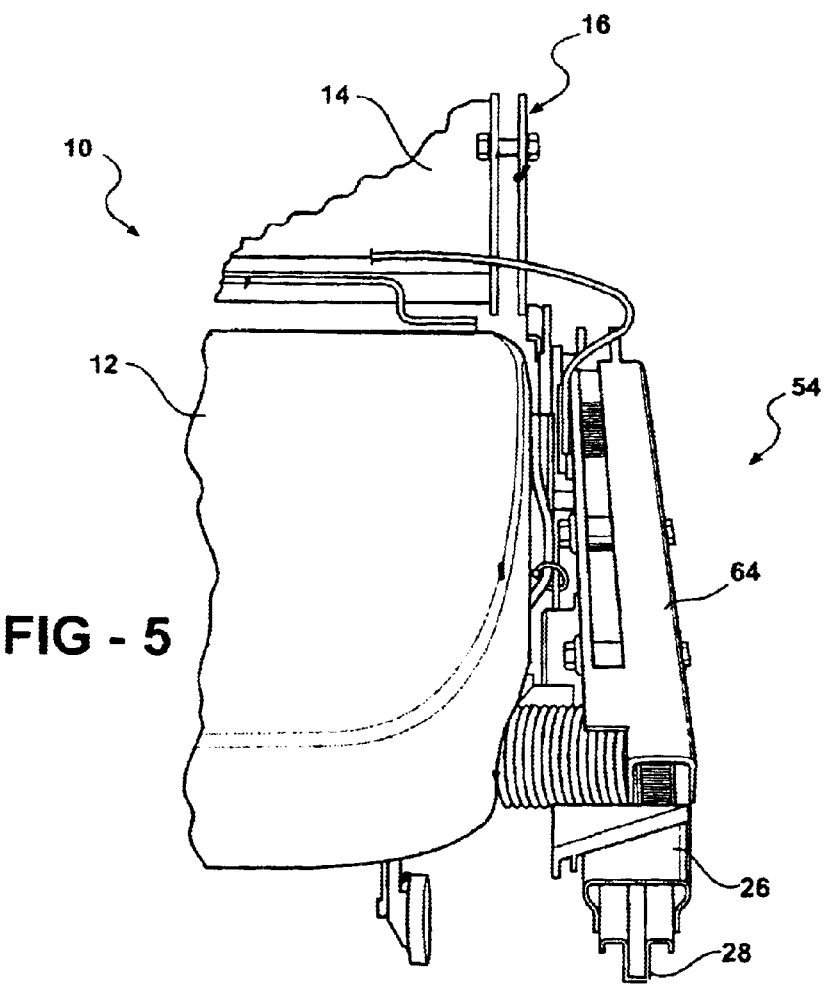
FIG. 5 is a front perspective view of a automatic fold mechanism coupled between the seat cushion and seat back of the seat assembly.
Figure 6:
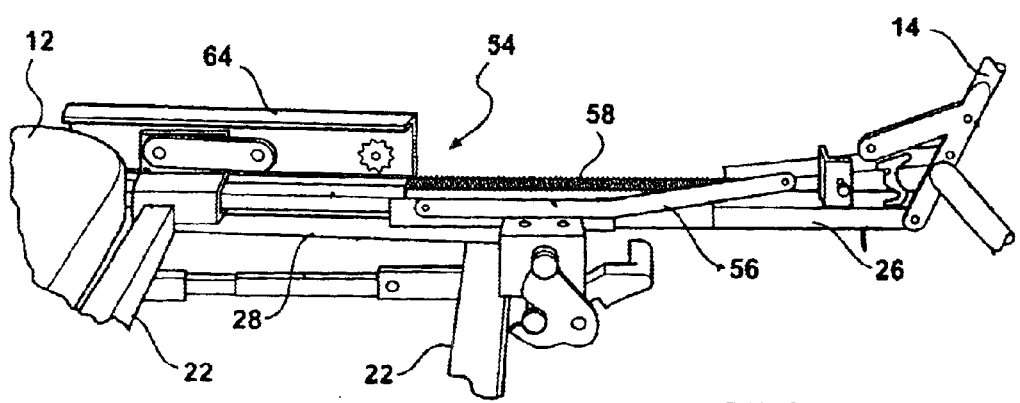
FIG. 6 is a side perspective view of the automatic fold mechanism.
Figure 7:
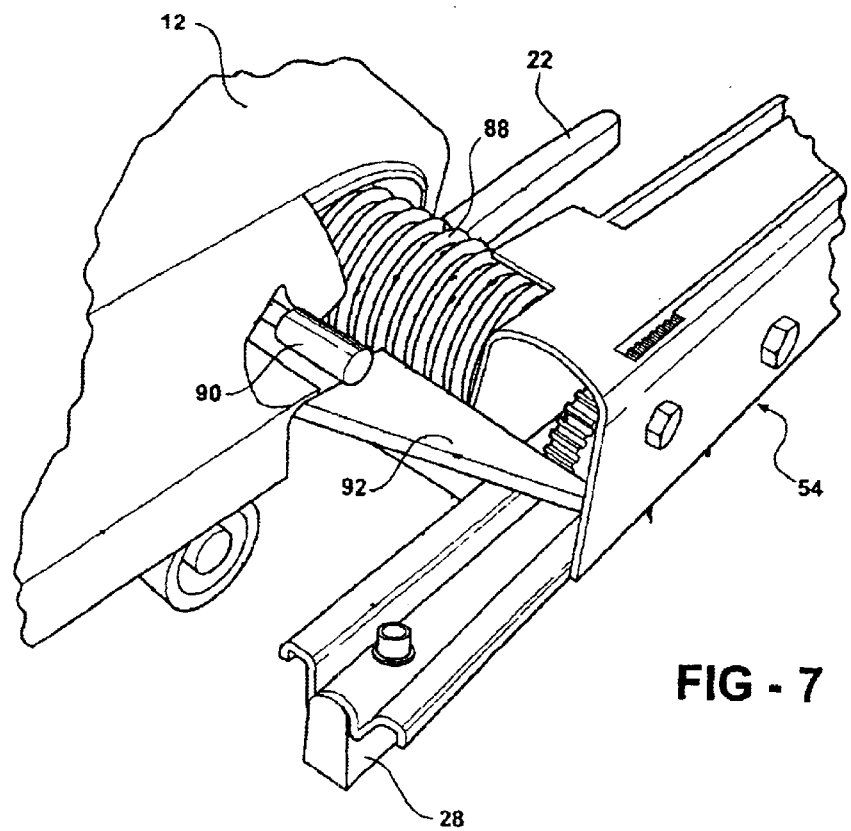
FIG. 7 is a partial front perspective view of the automatic fold mechanism.

Referring to FIGS. 5 and 8, a coil spring 88 is mounted between the seat cushion 12 and cage 64 to assist the rotation of the seat cushion 12 upon rotation between the seating position and the fold flat position. Additionally, a stop pin 90 projecting from the seat cushion 12 engages a stop plate 92 on the main support frame 22 to locate, stop and support the seat cushion 12 in the fold flat position.

Figure 10:
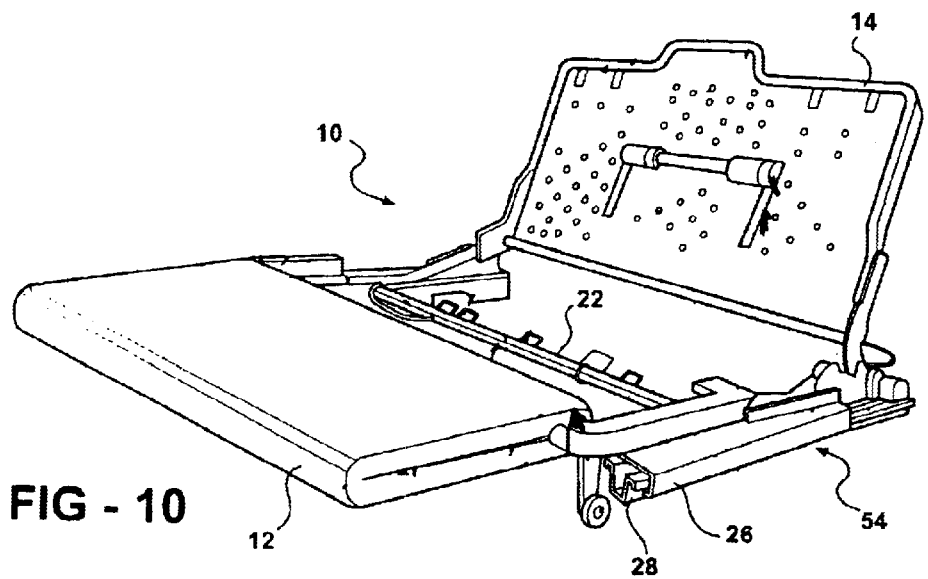
FIG. 10 is a perspective view of the seat cushion in the fold flat position.
Figure 11:
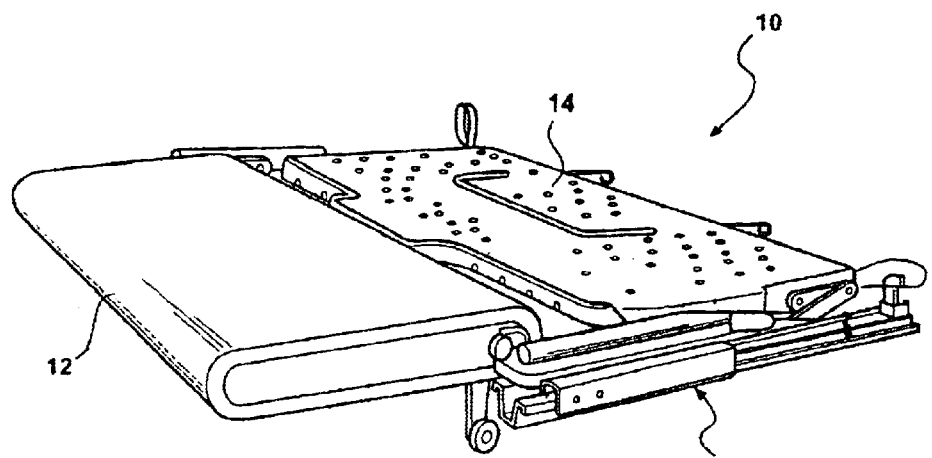
FIG. 11 is a perspective view of the seat cushion and seat back in the fold flat position.

Once the seat cushion 12 has been fully rotated from the seating position to the fold flat position, FIG. 10, the lower pivot latch 40 may be released such that the pivot mechanism 16 allows the seat back 14 to pivot about the lower pivot pin 36 from the upright seating position of FIG. 1 to a forwardly folded flat position aligned flush with the seat cushion 12 as shown in FIG. 11. The seat back 14 covers the space formed between the seat cushion 12 and seat back 14 when the seat cushion 12 is rotated to the fold flat position and the seat back 14 is in the upright position. The seat assembly 10 in the fold flat position forms a flush and flat cargo load floor within the vehicle.

To return the seat assembly 10 to the seating position, the seat back 14 is pivoted back to the upright seating position and locked by the pivot mechanism 16. The seat back 14 and upper tracks 26 are forced to slide forwardly along the lower tracks 28 to reverse the rotation of the gears of the auto fold mechanism 54 and automatically rotate the seat cushion 12 from the fold flat position to the seating position.

It should also be appreciated that the auto fold mechanism may be either manually operable, such as shown in the preferred embodiment, or powered operated. A power operated auto fold mechanism may include attaching a powered motor to the first drive shaft 60 to rotatably drive the drive shaft 60 and thus the first drive gear 62 along the toothed rack 58 to slide the upper track 26 relative to the lower track 28 moving the seat back 14 relative to the seat cushion 12. Additionally, rotating the first drive shaft 60 triggers actuation of the remaining gears of the auto fold mechanism 54 to drive the cushion shaft 80 to rotate or flip the seat cushion 12 as previously described.

Figure 12:
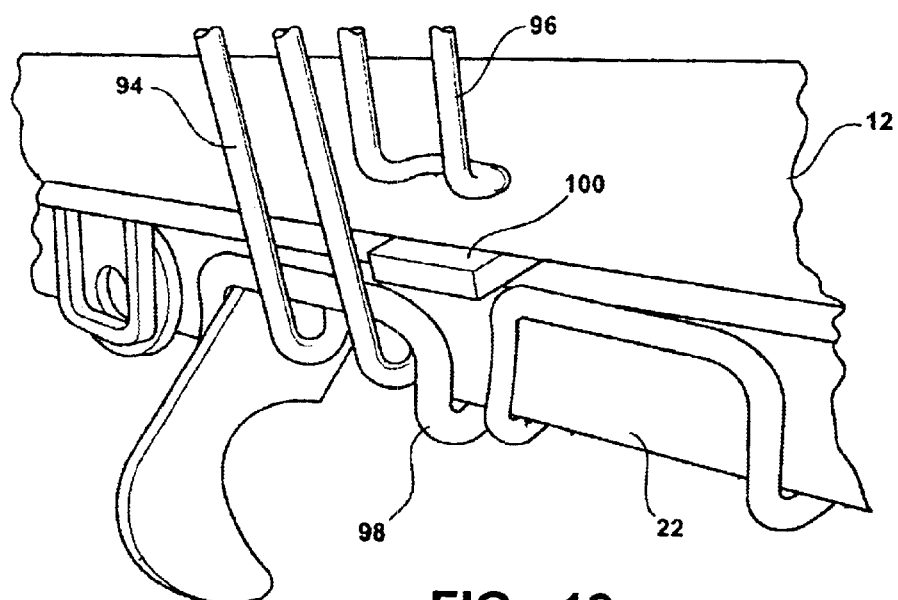
FIG. 12 is a perspective view of hooks extending from the seat back for transferring seat belt loads and retaining the seat cushion in the seating position.

Finally, referring to FIG. 12, the seat assembly 10 may also include a plurality of retaining hooks 94, 96 extending downwardly from the seat back 14. The hooks 94 are aligned to engage with loops 98 on the frame 22 to transfer seat belt loads to the floor of the vehicle. The hooks 96 engage with tabs 100 on the seat cushion 12 to retain the seat cushion 12 in the seating position.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A seat assembly for an automotive vehicle comprising:
   a main support frame adapted to secure said seat assembly to the floor of the vehicle;
   a seat cushion rotatably journaled to said main support frame for rotation between a seating position and a fold flat position rotated generally 180 degrees about said main support frame;

a seat back pivotally coupled to said main support frame for rotation between a generally upright seating position to a fold flat position aligned generally flush with said seat cushion in said fold flat position;

a lower track fixedly secured to said main support frame;

an upper track fixedly secured to said seat back and slidably secured to said lower track; and an automatic fold mechanism operatively coupled between said upper track and said seat cushion for automatically rotating said seat cushion between said seating position and said fold flat position in response to fore and aft sliding movement of said upper track along said lower track.

2. A seat assembly as set forth in claim 1 wherein said automatic fold mechanism includes a tooth rack fixedly secured to said upper track and extending longitudinally between first and second ends of said upper track.

3. A seat assembly as set forth in claim 2 wherein said automatic fold mechanism includes a support cage supported by said upper track and a first drive shaft having a first end rotatably journaled to said support cage and a second distal end.

4. A seat assembly as set forth in claim 3 wherein said automatic fold mechanism includes a first drive gear coupled to said second distal end of said first drive shaft for rotation therewith and continuously meshed with said tooth rack during said fore and aft sliding movement of said upper track relative to said lower track.

5. A seat assembly as set forth in claim 4 wherein said automatic fold mechanism includes a second drive gear coupled to said first drive shaft between said first and second ends for rotation therewith.

6. A seat assembly as set forth in claim 5 wherein said automatic fold mechanism includes a first driven shaft rotatably journaled to said support cage parallel to and spaced from said first drive shaft.

7. A seat assembly as set forth in claim 6 wherein said automatic fold mechanism includes a first driven gear coupled to said first driven shaft for rotation therewith and meshed with said first drive gear.

8. A seat assembly as set forth in claim 7 wherein said automatic fold mechanism includes a second driven gear coupled to said first driven shaft adjacent said first driven gear for rotation therewith.

9. A seat assembly as set forth in claim 8 wherein said automatic fold mechanism includes second driven shaft rotatably journaled to said support cage parallel to and spaced from said first driven shaft.

10. A seat assembly as set forth in claim 9 wherein said automatic fold mechanism includes a third driven gear coupled to said second driven shaft and a fourth driven gear coupled to said second driven shaft adjacent said third driven gear.

11. A seat assembly as set forth in claim 10 wherein said automatic fold mechanism includes a drive link coupled between said second driven gear and said fourth driven gear for transferring rotation of said first drive gear to said third driven gear.

12. A seat assembly as set forth in claim 11 wherein said automatic fold mechanism includes a cushion shaft fixedly secured to said seat cushion and rotatably journaled to said support cage parallel to and spaced from said second driven shaft.

13. A seat assembly as set forth in claim 12 wherein said automatic fold mechanism includes a fifth driven gear coupled to said cushion shaft and meshed with said third driven shaft for transferring said rotation of said first drive gear to rotation of said cushion shaft for automatically rotating said seat cushion between said seating position and said fold flat position in response to fore and aft sliding movement of said upper track along said lower track.

14. A seat assembly as set forth in claim 13 further including a bias member coupled between said seat cushion and said automatic fold mechanism for urging said seat cushion to rotate about said cushion shaft toward said fold flat position.

15. A seat assembly as set forth in claim 14 further including a stop pin projecting from said seat cushion for engaging with a stop plate supported by said main support frame when said seat cushion is in said fold flat position to locate, stop and support said seat cushion in said fold flat position.

16. A seat assembly as set forth in claim 15 further including a pivot mechanism interconnecting said seat back to said main support frame for providing selectively rotation of said seat back between said upright seating position and said fold flat position.

* * * * *

UNITED STATES PATENT AND TRADEMARK OFFICE
CERTIFICATE OF CORRECTION

PATENT NO. : 6,637,819 B2  Page 1 of 1
DATED : October 28, 2003
INVENTOR(S) : Tame It is certified that error appears in the above-identified patent and that said Letters Patent is hereby corrected as shown below:

<u>Column 6,</u>
Line 2, insert -- a -- after "includes".
Line 43, "selectively" should be -- selective --.

Signed and Sealed this

Third Day of February, 2004

JON W. DUDAS
*Acting Director of the United States Patent and Trademark Office*